US010559959B2

United States Patent
Bamberger et al.

(10) Patent No.: US 10,559,959 B2
(45) Date of Patent: Feb. 11, 2020

(54) MULTI-GENERATOR POWER PLANT ARRANGEMENT, ENERGY SUPPLY NETWORK HAVING A MULTI-GENERATOR POWER PLANT ARRANGEMENT AND METHOD FOR DISTRIBUTING REACTIVE POWER GENERATION IN A MULTI-GENERATOR POWER PLANT ARRANGEMENT

(71) Applicant: SIEMENS AKTIENGESELLSCHAFT, München (DE)

(72) Inventors: Joachim Bamberger, München (DE); Ulrich Münz, München (DE); Florian Steinke, München (DE)

(73) Assignee: Siemens Aktiengesellschaft, München (DE)

( * ) Notice: Subject to any disclaimer, the term of this patent is extended or adjusted under 35 U.S.C. 154(b) by 192 days.

(21) Appl. No.: 15/327,390

(22) PCT Filed: Jun. 30, 2015

(86) PCT No.: PCT/EP2015/064788
§ 371 (c)(1),
(2) Date: Jan. 19, 2017

(87) PCT Pub. No.: WO2016/012201
PCT Pub. Date: Jan. 28, 2016

(65) Prior Publication Data
US 2017/0163040 A1    Jun. 8, 2017

(30) Foreign Application Priority Data

Jul. 21, 2014    (DE) .................... 10 2014 214 151

(51) Int. Cl.
*H02J 3/38*    (2006.01)
*H02M 7/44*    (2006.01)

(52) U.S. Cl.
CPC ............. *H02J 3/383* (2013.01); *H02J 3/386* (2013.01); *H02M 7/44* (2013.01)

(58) Field of Classification Search
CPC .... H02J 3/38; H02J 3/383; H02J 3/386; H02J 1/102; H02J 1/10; H02J 3/14; H02M 7/44; H02M 3/1584; G06F 1/26
(Continued)

(56) References Cited

U.S. PATENT DOCUMENTS

2005/0117375 A1   6/2005   Xu
2013/0175800 A1*  7/2013   Bluhm ................ F03D 7/0284
                                                  290/44
(Continued)

FOREIGN PATENT DOCUMENTS

DE          2112173 A1    9/1972
DE     102009037523 A1   10/2010
(Continued)

OTHER PUBLICATIONS

International Search Report for PCT Application No. PCT/EP2015/064788, dated Jun. 30, 2015.
(Continued)

*Primary Examiner* — Thienvu V Tran
*Assistant Examiner* — Brian K Baxter
(74) *Attorney, Agent, or Firm* — Schmeiser, Olsen & Watts LLP

(57) ABSTRACT

A multi-generator power plant arrangement, energy supply network having a multi-generator power plant arrangement and method for distributing reactive power generation in a multi-generator power plant arrangement, is provided. A multi-generator power plant arrangement, and also a method (Continued)

for distributing reactive power generation in a multi-generator power plant arrangement, is provided. The control parameters for the controllers of the individual generators of a multi-generator power plant arrangement are thereby calculated individually on the basis of predetermined parameters and transmitted to the controllers of the individual generators. Consequently, the reactive power component to be generated in each case can be individually specified for each generator of a multi-generator power plant arrangement.

14 Claims, 2 Drawing Sheets

(58) Field of Classification Search
USPC .......................................................... 307/52
See application file for complete search history.

(56) References Cited

U.S. PATENT DOCUMENTS

| | | | | |
|---|---|---|---|---|
| 2014/0316604 A1* | 10/2014 | Ortjohann | ............... | H02J 3/381 |
| | | | | 700/298 |
| 2016/0204480 A1* | 7/2016 | Triebel | ..................... | H02J 7/34 |
| | | | | 429/7 |
| 2016/0306372 A1* | 10/2016 | Holveck | ................. | G05F 1/625 |
| 2017/0229857 A1* | 8/2017 | Kral | ........................ | H02J 3/382 |

FOREIGN PATENT DOCUMENTS

DE     102010056457 A1    7/2012
WO    WO 2013124133 A1    8/2013

OTHER PUBLICATIONS

Non-English Indian Office Action dated Feb. 27, 2019 for Application No. 201717001809.

\* cited by examiner

MULTI-GENERATOR POWER PLANT ARRANGEMENT, ENERGY SUPPLY NETWORK HAVING A MULTI-GENERATOR POWER PLANT ARRANGEMENT AND METHOD FOR DISTRIBUTING REACTIVE POWER GENERATION IN A MULTI-GENERATOR POWER PLANT ARRANGEMENT

CROSS-REFERENCE TO RELATED APPLICATIONS

This application claims priority to PCT Application No. PCT/EP2015/064788, having a filing date of Jun. 30, 2015, based off of DE Application No. 10 2014 214 151.6 having a filing date of Jul. 21, 2014, the entire contents of which are hereby incorporated by reference.

FIELD OF TECHNOLOGY

The following relates to a multi-generator power plant arrangement, to an energy supply network having such a multi-generator power plant arrangement, and also to a method for distributing reactive power generation in a multi-generator power plant arrangement.

BACKGROUND

The document DE 10 2010 056 457 A1 discloses a windfarm with a plurality of wind turbines. A central control device can calculate target values for the reactive powers that are to be provided by the individual wind turbines. In the event of a network fault of the supply network, these centrally calculated target values are ignored by the individual wind turbines.

Multi-generator power plant arrangements (multi-generator power plants, MGPP) comprise a number of generators for generating electrical power. It is also possible in particular for generators of different types to be combined. For example, a multi-generator power plant arrangement may comprise wind turbines, photovoltaic arrays with individual inverters, electrical storage systems such as for example batteries, flywheels or supercapacitors with individual inverters, diesel generators, gas turbines and/or further generators. All of the generators of such a multi-generator power plant arrangement are brought together at a common point, which is formed as the electrical interface of the multi-generator power plant arrangement with an electrical energy supply network. This electrical interface is referred to as the point of common coupling (PCC). The energy supply network into which the multi-generator power plant arrangement feeds the electrical power may be for example a transmission grid or a distribution grid or else an isolated grid.

In the case of power plant arrangements, a distinction is generally drawn between so-called grid-forming power plants and so-called grid-supporting power plants.

Grid-forming power plants provide the electrical voltage at a specified amplitude and frequency. Examples of grid-forming power plants in the European synchronous grid are nuclear or coal power plants. Grid-supporting power plants feed active power and reactive power into an energy supply network in dependence on the frequency and amplitude of the voltage at the point of common coupling. In the case of grid-supporting power plants, the reactive power is typically adapted in dependence on the amplitude of the voltage at the point of common coupling, even relatively small fluctuations in the amplitude of the grid voltage potentially leading to a significant variation in the reactive power that is fed in. An example of such grid-supporting power plants are windfarms. Such control of the feeding in of the reactive power in dependence on the voltage amplitude is not directly possible in the case of grid-forming power plants because of the voltage amplitude being specified at the point of common coupling. Rather, in the case of grid-forming power plant arrangements, the reactive power that is fed in at the point of common coupling depends on the configuration of the grid and the further generators and loads in the grid.

In the case of multi-generator power plant arrangements, the reactive power to be provided at the network feeding-in point can and must additionally be distributed among the plurality of generators of this power plant arrangement. However, this entails the risk that on the one hand the reactive power to be provided is distributed very unevenly among the generators and that on the other hand reactive currents flow within the multi-generator power plant arrangement, and though not contributing to the reactive power at the point of common coupling do place a great load on the individual generators, and can possibly lead to an overloading of these generators.

SUMMARY

An aspect relates to a multi-generator power plant arrangement and a method for distributing the reactive power generation in a multi-generator power plant arrangement that allow specific control of the reactive power generation in the individual generators of the multi-generator power plant arrangement.

According to a first aspect, for this purpose the following provides a multi-generator power plant arrangement, with a network feeding-in point, which is electrically coupled to an energy supply network; with a plurality of generators, which are in each case electrically coupled to the network feeding-in point and are designed to provide reactive power in dependence on a control variable, at least one of the generators being a grid-forming generator, which is designed to provide an output voltage at a specified amplitude and a specified frequency or phase on the basis of a further control variable; and with a control device, which is designed to calculate the control variables for the output voltage of each grid-forming generator by using a reactive power to be fed in by the respective generator, and to provide the calculated control variables at the respective generators.

According to a further aspect, the following provides a method for distributing the reactive power generation in a multi-generator power plant arrangement with a plurality of generators, at least one of the generators being a grid-forming generator, which is designed to provide an output voltage at a specified amplitude and a specified frequency or phase. The method comprises the steps of determining a reactive power to be generated by the multi-generator power plant arrangement; dividing the reactive power to be generated among the generators of the multi-generator power plant arrangement; calculating control variables for the output voltage of the grid-forming generators of the multi-generator power plant arrangement, the respective control variable being calculated by using a reactive power to be fed in by the respective generator; and transmitting the control variables to the generators.

The following is based on the realization that, in the case of electrical generators, in particular in the case of grid-forming generators, only the frequency and amplitude of the output voltage of the generators can be specified. By contrast, a direct setting of the active power and reactive power to be output is generally not possible. Therefore, the reactive power delivered by such a generator can only take place by way of specifying a target voltage.

An idea on which embodiments of the present invention is based is therefore that, for dividing up the reactive power in a multi-generator power plant arrangement, control variables should be individually set respectively for each generator of this multi-generator power plant arrangement, such as for example the target values for the output voltages of the grid-forming generators and the target values for the reactive power to be fed in for the grid-supporting generators. This allows the generation of the reactive power within the multi-generator power plant arrangement to be distributed specifically to a desired extent among the individual generators. This reduces the risk of the individual generators unwantedly being unevenly loaded and of reactive power unnecessarily flowing back and forth between the individual generators of the multi-generator power plant arrangement, and though putting a load on the generators not being provided as reactive power at the point of common coupling.

In addition, by specifically and individually setting the reactive power generation of each individual generator of a multi-generator power plant arrangement, there can be a prioritization of the reactive power generation at desired generators, while other generators by contrast do not make any contribution, or only contribute to a small extent, to the provision of reactive power.

This specific setting of the reactive power generation in accordance with a specification of individual control variables for each individual generator consequently allows an optimized, stable and efficient generation of reactive power in a multi-generator power plant arrangement to be achieved, without overloading of individual generators occurring as a result of reactive currents within the multi-generator power plant arrangement.

According to one embodiment, the control device calculates the control variables for the reactive power of a generator to be provided by using an impedance between the respective generator and the network feeding-in point.

By taking into account the impedance between the generator and the network feeding-in point, the voltage drops along the electrical connection between the generator and the network feeding-in point, and possibly over further components between the generator and the network feeding-in point, are taken into account. As a result, a precise calculation of the required control variables for the setting of the reactive power generation at the respective generators is possible.

According to a specific embodiment, the impedance between the generator and the network feeding-in point comprises the power impedance between the generator and the network feeding-in point.

According to a further embodiment, the multi-generator power plant arrangement also comprises a transformer, which is arranged between the network feeding-in point and at least one generator. The impedance between the generator and the network feeding-in point, which in this case is used for the calculation of the control variable for the respective generator, in this case comprises the reactances of the transformer.

By taking into account the reactances of a transformer in the determination of the control variable for a generator, a precise setting of a generator can be performed even when the voltage level of the generator does not coincide with the voltage level of the network feeding-in point, and consequently the voltage between the generator and the network feeding-in point has to be transformed.

According to a further embodiment, the grid-supporting generators of the plurality of generators comprise a droop controller which is designed to set the reactive power provided by the respective generator in dependence on a voltage offset and/or a controller steepness or a droop controller which is designed to set the voltage provided by the respective generator in dependence on a reactive power offset or reactive current offset and/or a controller steepness.

According to one embodiment, the control device is designed to determine a control variable that adapts the voltage offset, the reactive power offset or the reactive current offset of a droop controller of a generator.

According to a further embodiment, the control device is designed to determine a control variable that adapts the controller steepness of the droop controller of a generator. In particular, the controller steepnesses may be adapted in such a way that a change in the reactive power at the point of common coupling is divided among the generators in accordance with a predefined ratio, without the parameters of the droop controller having to be newly set.

The adaptation of the voltage offset or reactive power/reactive current offset and/or the controller steepness of a droop controller in a generator allows the control device easily to set the reactive power generated by the respective generator. Consequently, the reactive power generated by the respective generators can be individually adapted by an individual setting of the voltage offset or reactive power/reactive current offset and/or the controller steepness. This applies both to withdrawals of reactive power that are constant and to withdrawals of reactive power that vary over time from the network. For withdrawals of reactive power that vary over time, the dividing of a constant reactive power, for example the average reactive power, is set by way of the voltage offset or reactive power/reactive current offset and the dividing of the deviation from this constant reactive power is set by way of the controller steepnesses.

According to one embodiment, the multi-generator power plant arrangement comprises a grid-forming power plant arrangement, which is designed to provide a network voltage at a predetermined amplitude and a predetermined frequency or phase at a network feeding-in point. Such a grid-forming power plant arrangement at the same time also provides the reactive power that is inevitably produced as a result of the configuration of the remaining network.

According to a further embodiment, the multi-generator power plant arrangement comprises a grid-supporting power plant arrangement, the control device being designed to set the reactive power to be provided at the network feeding-in point in dependence on a network voltage at the network feeding-in point.

According to a further embodiment, the step for calculating the control variable for the generators in the method for distributing the reactive power generation in a multi-generator power plant arrangement calculates the control variables by using the impedance between the network feeding-in point and the respective generator.

According to a further embodiment, the reactive power is divided among the individual generators by using a predetermined ratio or predetermined rules. The dividing may be performed on the basis of rules that are manually input by a user. Alternatively, the dividing may also be performed automatically on the basis of a predetermined ratio and/or predetermined formulas or rules.

According to a further aspect, the following relates to an energy supply network with a multi-generator power plant arrangement according to embodiments of the invention. The use of multi-generator power plant arrangements according to embodiments of the invention that allow an individual setting of the reactive power generation for the respective generators makes stable network feeding by grid-forming and/or grid-supporting multi-generator power plant arrangements possible, in particular also in the case of isolated grids.

According to one embodiment, the energy supply network also comprises a further network feeding-in point and a further generator, the further generator being a grid-forming generator, which is designed to provide an output voltage at a predetermined amplitude and a predetermined frequency or phase. The further generator may also be a further multi-generator power plant arrangement with at least one grid-forming generator. The further generator is electrically coupled to the further network feeding-in point. Furthermore, the further generator is designed to provide reactive power in dependence on a control variable. The control device of the multi-generator power plant arrangement is in this case also designed to determine a control variable for the further generator and transmit this control variable to the further generator.

Such a configuration also allows the reactive power that is provided by further generators outside the multi-generator power plant arrangement to be specifically set. Consequently, a precise and comprehensive control of the reactive power generated is possible.

According to a further embodiment, the energy supply network also comprises a further, higher-level control device, which is designed to determine a variable for a reactive power to be provided and/or to determine the predetermined output voltage of the further generator that is to be set and to transmit this variable to the control device of a multi-generator power plant arrangement.

In this way it is also possible to realize a multi-stage, hierarchical adaptation of the reactive power to be generated in relatively large energy supply networks.

BRIEF DESCRIPTION

Some of the embodiments will be described in detail, with reference to the following figures, wherein like designations denote like members, wherein.

DETAILED DESCRIPTION

Figure 1:
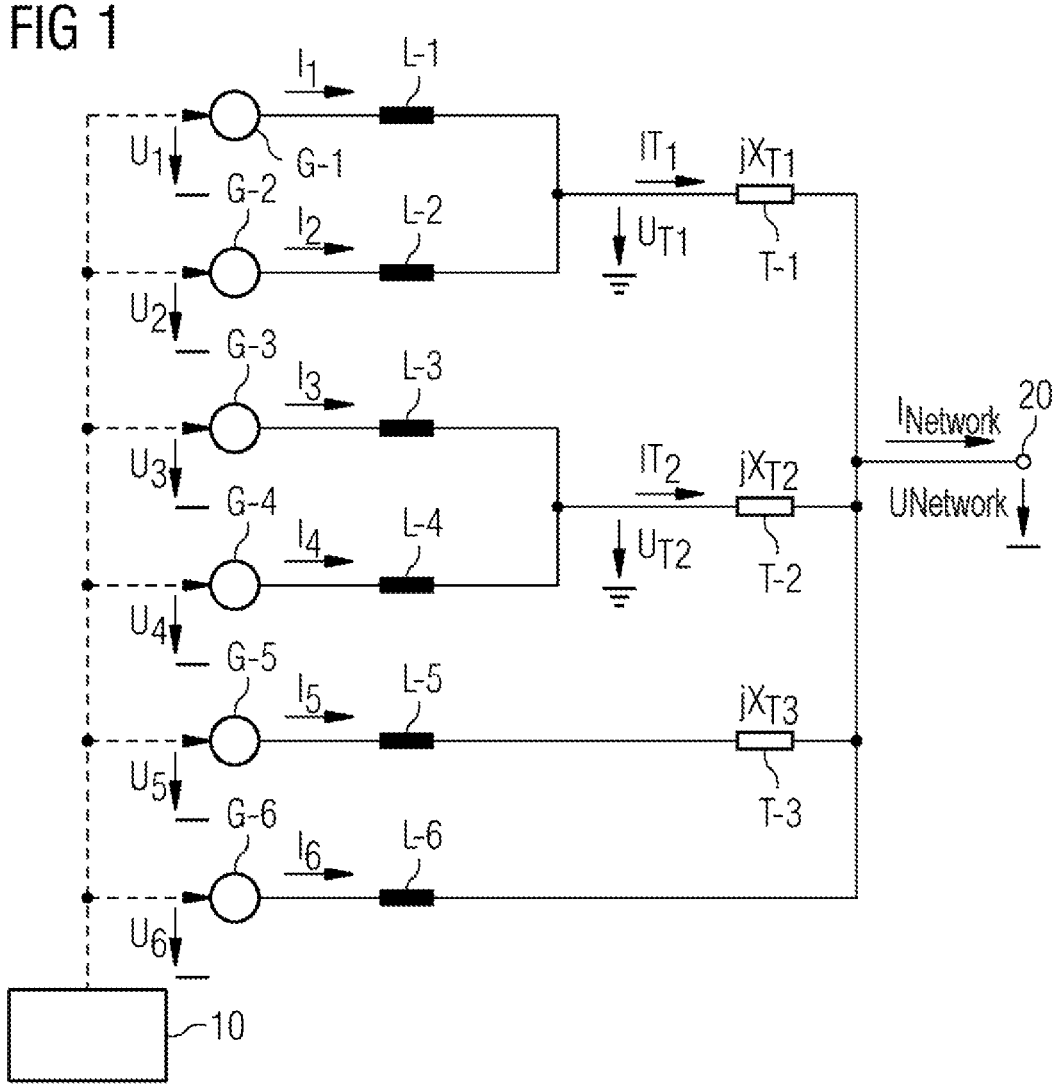
FIG. 1 shows a schematic representation of a multi-generator power plant arrangement according to one embodiment.

FIG. 1 shows a schematic representation of a multi-generator power plant arrangement 1 according to one embodiment. The multi-generator power plant arrangement 1 comprises a plurality of individual generators G-1 to G-6. The generators G-i may be any desired generators for generating electrical power. For example, the generators G-i may be wind turbines, photovoltaic installations with separate inverters, storage systems such as for example fly-wheels, compressed-air stores, batteries or supercapacitors, which likewise have in each case a separate inverter, diesel generators, gas turbines, or any desired further generator for generating electrical power. The individual generators G-i may be of any desired, different types. One or more generators of the same type is/are however also possible. The generators G-i are connected in each case by way of an electrical connection L-i to a point of common coupling 20. The electrical connections L-i between the generators G-i and the point of common coupling 20 have the impedances $Z_i = R_i + jX_i$.

If the voltage level at the output of a generator G-i differs from the voltage level of the energy supply network N at the point of common coupling 20, the voltage level can be equalized by interposing a transformer T-1 to T-3. For this purpose, the outputs of a number of generators G-i may possibly be connected in parallel to the input of a transformer T-i, as long as the voltage levels of the parallel-connected generators are the same. Each of the generators T-i has a reactance $jX_{Ti}$. The ohmic resistances $R_{Ti}$ of the respective transformers T-i are relatively low in comparison with the respective reactance $X_{Ti}$, and can therefore be ignored.

The configuration represented here, comprising six generators G-1 to G-6 and three transformers T1 to T3, has only been chosen by way of example and serves for explaining embodiments of the invention to provide a better understanding, without thereby restricting embodiments of the invention to this configuration.

During the operation of the multi-generator power plant arrangement 1, active power and reactive power are respectively generated by the generators G-i and fed by way of the lines L-i and possibly by way of the transformers T-i at the point of common coupling 20 into the energy supply network N. While in the case of a conventional power plant arrangement with only one generator in grid-supporting operation a simple closed-loop control of the reactive power to be generated can be determined on the basis of a change in voltage at the point of common coupling 20, or in grid-forming operation the reactive power generation is unvaryingly specified by the constant network voltage amplitude, such a simple closed-loop control is not possible in the case of a multi-generator power plant arrangement. At least some of the generators G-i of the multi-generator power plant arrangement 1 are generally intrinsically grid-forming. Therefore, only a setting point for voltage and frequency can be specified for these generators G-i. By contrast, a direct setting for the active power or reactive power to be provided is generally not possible. Therefore, the reactive power flow depends on the individual voltage levels at the generators G-i. However, in the case of a voltage of 400 V, a change in voltage of just one volt or less already leads to a very strong change in the reactive power provided by the respective generator G-i. The voltage-dependent provision of reactive power at a grid-forming generator G-i is realized by a so-called droop controller. In this case, the output voltage $U_1$ at the output of a grid-forming generator G-i can be set as follows.

$$U_i = U_0 - k_{Qi}(I_{Qi} - I_{Q0i}) \quad (1)$$

where $U_0$ is the reference voltage, $k_{Qi}$ is the steepness of the controller i, $I_{Qi}$ is the reactive current delivered by the generator i, and $I_{Q0i}$ is the setting point of the reactive current. The reference voltage $U_0$ is generally the same for all of the generators G-i with respect to their rated voltage $U_{Ni}$. Consequently, $\Delta U_{i0}=k_Q \cdot I_{Q0i}$ gives as an alternative form of controller $$U_i = U_0 + \Delta U_{i0} - k_{Qi} \cdot I_{Qi}. \qquad (2)$$

The reactive current $I_Q$ is used in each case in place of the reactive power Q in the previously presented formulas. For voltages close to the rated voltage $U_N$, the following relationship applies for the reactive power Q and the active power P; $I_Q = Q/(\sqrt{3} \cdot U_N)$ and $I_P = P/(\sqrt{3} \cdot U_N)$. This allows the two controllers also to be implemented in the following form in dependence on the reactive power.

$$U_i = U_0 - k_{Qi}/(\sqrt{3} \cdot U_{Ni}) \cdot (Q_i - Q_{i0})$$

$$U_i = U_0 + \Delta U_{i0} - k_{Qi}/(\sqrt{3} \cdot U_{Ni}) \cdot Q_i.$$

where $Q_i$ is the reactive power delivered by the generator i and $Q_{i0} = I_{Q0i} \cdot \sqrt{3} \cdot U_{Ni}$ is the setting point of the reactive power.

In a similar way, the voltage-dependent provision of reactive power at a grid-supporting generator G-i is realized by another droop controller. In this case, the fed-in reactive power $Q_i$ of a generator G-i can be set as follows.

$$Q_i = Q_{i0} - (\sqrt{3} \cdot U_{Ni})/k_{Qi}(U_i - U_0)$$

where $Q_{i0} = I_{Q0i} \cdot \sqrt{3} \cdot U_{Ni}$ is the setting point of the reactive power, $U_0$ is the reference voltage and $k_{Qi}$ is the steepness of the controller.

It is explained below how the reference voltage $U_0$ can be used to set the voltage at the point of common coupling 20 to a predetermined reference voltage.

For this purpose, it is now assumed for the sake of simplicity that a load $Z_L$ is fed by two generators, which respectively feed the output voltage $U_1$ and $U_2$ with the output currents $I_1$ and $I_2$ and the impedances $Z_1$ and $Z_2$. This gives for the current $I_L$ through the load $Z_L$:

$$I_L = I_1 + I_2$$
$$= Y_1(Z_1, Z_2, Z_L)U_1 + Y_2(Z_1, Z_2, Z_L)U_2$$

where $Y_1$ and $Y_2$ are constant admittances, which can be calculated from the impedances $Z_1$, $Z_2$ and $Z_L$. If the voltages $U_1$ and $U_2$ of the two generators are now raised by the same voltage difference $\Delta U \cdot U_{Ni}$ with respect to their rated voltage $U_{Ni}$, this gives $$I_L + \Delta I_L = I_1 + \Delta I_1 + I_2 + \Delta I_2 = Y_1(U_1 + \Delta U \cdot U_{N1}) + Y_2(U_2 + \Delta U \cdot U_{N2})$$

$$\Delta I_L = (Y_1 U_{N1} + Y_2 U_{N2}) \Delta U$$

By analogy, the following is obtained for the currents $I_1$ and $I_2$ $$I_1 = Y_{11}(Z_1, Z_2, Z_L)U_1 + Y_{12}(Z_1, Z_2, Z_L)U_2$$

$$I_2 = Y_{21}(Z_1, Z_2, Z_L)U_1 + Y_{22}(Z_1, Z_2, Z_L)U_2$$

and for the changes in current $\Delta I_1$ and $\Delta I_2$ $$\Delta I_1 = (Y_{11} U_{N1} + Y_{12} U_{N2}) \Delta U$$

$$\Delta I_2 = (Y_{21} U_{N1} + Y_{22} U_{N2}) \Delta U$$

Since the voltages $U_1$ and $U_2$ are very close to their rated voltages $U_{N1}$ and $U_{N2}$, it follows that $\Delta I_1 : \Delta I_2 = I_1 : I_2$, that is to say that the two currents rise in proportion to their current intensity before the rise. Consequently, the active power and reactive power therefore also rise correspondingly proportionally. This approximation also applies to multi-generator power plant arrangements with more than two generators.

It is evident from the previous statements that a simultaneous raising or lowering of the set voltage at all of the generators G-i can be used to adapt the voltage $U_{network}$ at the point of common coupling 20, and consequently set it to a specified reference voltage.

For example, for this purpose the control device 10 may record the voltage at the point of common coupling 20. If the control device 10 detects that the recorded voltage at the point of common coupling 20 deviates from the specified reference voltage, the control device 10 can then calculate for the reference voltage $U_0$ of all the generators G-i an identical (with respect to the rated voltages $U_{Ni}$) voltage difference $\Delta U$, in order to compensate for the voltage fluctuation at the point of common coupling 20 and thereby reset the voltage at the point of common coupling 20 to the specified target value, for example the rated voltage. For example, the adaptation of the voltage and the calculation of the target voltage value required for this may be performed by an integral controller (I controller) or a proportional-integral controller (PI controller). In this way, even in a multi-generator power plant arrangement 1, the voltage $U_{network}$ at the point of common coupling 20 is set to a specified reference value by specific, individual and simultaneous adaptation of the target voltages $U_0$ of the generators G-i.

If a single generator G-i is connected to the point of common coupling 20 by way of a transformer T-i, as is the case for example for the generator G-5 in FIG. 1, it can in this case be assumed that the reactance $X_{Ti}$ of the respective transformer T-i is much greater than the impedance $Z_i$ of the electrical line L-i between the generator G-i and the point of common coupling 20. In the event therefore that a transformer T-i is arranged between a generator G-i and the point of common coupling 20, the following relationship is obtained by approximation between the voltage $U_{network}$ at the point of common coupling 20 and the voltage $U_i$ at the generator G-i:

$$U_{Network} = U_i - X_{Ti} \cdot I_{Qi}$$

and furthermore according to formula 1:

$$U_{Network} - U_0 = -k_{Qi}(I_{Qi} - I_{Q0,i}) - X_{Ti} \cdot I_{Qi}$$

Consequently, the reactive current $I_{Q05}$ to be set at the generator G-5 is set as follows $$I_{Q0i} = \hat{I}_{Q0i}\left(1 + \frac{X_{Ti}}{k_{Qi}}\right)$$

where $\hat{I}_{Q0i}$ is the required reactive current that is to be provided by the generator G-i. The following relationship is consequently obtained:

$$U_{Network} - U_0 = -(k_{Qi} + X_{Ti})(I_{Qi} - \hat{I}_{Q0i})$$

If a generator G-i is connected directly to the point of common coupling 20, without a transformer T-i being arranged in between, as is the case for example for the generator G-6 in FIG. 1, the line L-i lying in between has an impedance $Z_i = R_i - jX_i$. For a generator G-i, the following relationship is obtained for example for this:

$$U_{Network} - U_0 = -k_{Qi}(I_{Qi} - I_{Q0i}) - R_i \cdot I_{Pi} - X_i \cdot I_{Qi},$$

where $I_{Pi}$ is the active current from the generator G-i. Consequently, the reactive current $I_{Q0i}$ can be chosen as follows:

$$I_{Q0i} = \hat{I}_{Q0i}\left(1 + \frac{X_i}{k_{Qi}}\right) + \frac{Ri}{k_{Qi}}\hat{I}_{Pi}$$

where $\hat{I}_{Q0i}$ is the required reactive current from the generator G-i and $\hat{I}_{Pi}$ is the measured or estimated active current of the generator G-i. If the active current $\hat{I}_{Pi}$ is to be estimated, it can for example be calculated by the control device 10 or some other device. If $k_{Qi}$ is very much greater than the maximum of $X_i$ and $R_i$, the formula given above is simplified as follows:

$$I_{Q0i} = \hat{I}_{Q0i} + \frac{Ri}{k_{Qi}}\hat{I}_{Pi}$$

If in addition $\hat{I}_{Qi}$ is very much greater than $(R_i:k_{Qi})I_{Pi}$, the following is obtained for the reactive current $I_{Q06}$ to be set:

$$I_{Q0i} = \hat{I}_{Q0i}.$$

If the outputs of a number of generators G-i are connected to the input of a common transformer T-i, as is the case for example for the generators G-1 and G-2 in FIG. 1, which are connected to the common transformer T-1, it can in this case be assumed that the reactance of this transformer T-1 is very much greater than the impedance of the lines L-1 and L-2. Consequently, the following relationship applies to such a generator G-i for a grid-forming power plant arrangement:

$$U_{Ti} - U_0 = -k_{Qi}(I_{Qi} - I_{Q0i}) - R_i I_{Pi} - X_i I_{Qi}$$

For this purpose, the following specification is obtained for the reactive current $I_{Q0i}$ to be set:

$$I_{Q0i} = \hat{I}_{Q0i}\left(1 + \frac{X_i}{k_{Qi}}\right)\frac{X_{Ti}}{k_{Qi}}\sum_n \hat{I}_{Q0n} + \frac{R_1}{k_{Qi}}\hat{I}_{Pi} \quad (3)$$

where $\hat{I}_{Q0i}$ is the required reactive current from the generator G-i and $\hat{I}_{Pi}$ is a measured or calculated active current being fed in at the time. The index n for the summation of the reactive currents thereby runs through all of the indices of the generators G-i connected to the transformer. It also follows that:

$$U_{Network} - U_o = U_{Ti} - U_o - X_{Ti}I_{QTi} \quad (4)$$
$$= -(k_{Qi} + X_i)(I_{Qi} - \hat{I}_{Q0i}) - R_i(I_{Pi} - \hat{I}_{Pi}) -$$
$$X_{Ti}\sum_n (I_{Qn} - \hat{I}_{Q0n})$$

By analogy, the following is obtained for a grid-supporting power plant arrangement:

$$I_{Qi} = I_{Q0i} - \frac{1}{k_{Qi}}(U_{Network} + X_{Ti}I_{QTi} + R_i I_{Pi} + X_i I_{Qi} - U_o) \quad (5)$$

Equation (5) can consequently be reformulated with the aid of (3) so as to obtain in turn (4).

There follows a description of an algorithm for a method for dividing reactive powers in a multi-generator power plant arrangement with 6 generators as represented in FIG. 1 in a way corresponding to the previously described relationships. It is thereby assumed that the active current $I_{Pi}$ to be set and the estimated or measured active current $\hat{I}_{Pi}$ are identical. Consequently, the following relationship is obtained for the voltage offsets to be set at the individual generators G-i:

$$\Delta U_{Network}\mathbb{1} = -(\text{diag}(k_Q + X) + M)\Delta I_Q$$
$$k_Q = (k_{Q1} \ldots k_{Q6})^T$$
$$X = (X_1 \ldots X_6)^T$$
$$M = \begin{pmatrix} X_{T1}\mathbb{1} & 0 & 0 \\ 0 & X_{T2}\mathbb{1} & 0 \\ 0 & 0 & 0 \end{pmatrix}$$
$$I_Q = (I_{Q1} \ldots I_{Q6})^T$$
$$\hat{I}_{Q0} = (\hat{I}_{Q01} \ldots \hat{I}_{Q06})^T$$
$$\Delta I_Q = \hat{I}_Q - \hat{I}_{Q0}$$

where $\Delta U_{network} = U_{network} - U_0$, and $1$ and $\mathbb{1}$ are respectively a vector and a square matrix of the corresponding variable that has a 1 in all places, and 0 is analogously a zero matrix of the corresponding variable.

The reactive current $I_{Qnetwork}$ at the point of common coupling 20 may be broken down as follows into a static component $I_{Qnetwork0}$ and a variable component $\Delta I_{Qnetwork}$:

$$I_{QNetwork} = I_{QNetwork0} - \Delta I_{QNetwork} = 1^T I_Q = 1^T I_{Q0} + 1^T \Delta I_Q$$

For distributing the static component $I_{Qnetwork0}$ that is provided by the individual generators G-i, the specified reactive current values $\hat{I}_{Q0i}$ can be used. The dividing of the variable component $\Delta I_{Qnetwork}$ can be correspondingly adapted with the aid of the steepnesses $k_{Qi}$ of the individual controllers to the generators G-i. By analogy with the dividing of the variable component of the reactive currents, a dividing of the variable component of the reactive current may also be performed. The desired ratio of the reactive currents $\Delta I_Q$ is denoted here by the vector $\Delta I^*_Q$, it being assumed that the elements of the vector $\Delta I^*_Q$ add up to 1. It consequently follows that:

$$\frac{\Delta U_{Network}}{\Delta I_{QNetwork}}1 = -(\text{diag}(k_Q + X) + M)\Delta I^*_Q$$

$$\frac{\Delta U_{Network}}{\Delta I_{QNetwork}}1 = -\text{diag}(\Delta I^*_Q)(k_Q + X) - M\Delta I^*_Q$$

From this, the steepness of the controllers $k_Q$ can be determined $$k_Q = -X - \text{diag}((\Delta I^*_Q)^{-1})\left(\frac{\Delta U_{Network}}{\Delta I_{QNetwork}}1 + M\Delta I^*_Q\right)$$

where the scalar parameter $\mu = (\Delta N_{network}/\Delta I_{Q\ network})$ is a freely selectable design parameter that indicates the correlation between the deviation of the reactive current $I_{Qnetwork}$ from its static component $I_{Qnetwork0}$, that is to say $\Delta I_{Q\ network}$, and the voltage difference between the network voltage $U_{network}$ and $U_0$. Preferably, μ is chosen here in the region of just a few percent, so that great variations in the reactive power provided at the point of common coupling 20 only lead to a small variation of the voltage $U_0$ to be set. This additionally leads to the steepness of the controller only being very small. For a positive steepness of the controller $k_Q>0$, it also applies that $\Delta U_{network}<0$, and consequently that $U_0$ is greater than $U_{network}$. In addition, however, negative steepnesses are also possible for controllers, in the case of which therefore $\Delta U_{network}>0$ is also possible.

On the basis of the previous statements, the control device 10 can determine control variables for the target voltage to be set respectively at all of the generators G-i and transmit these to the respective generators G-i. Furthermore the controller steepness at the individual generators G-i is also modifiable, so the control device 10 can additionally also determine the respective steepness of the controllers $k_{Qi}$ and transmit it to the generators G-i. The dividing of the reactive power to be generated among the available generators G-i can be specified by a user or else automatically by a suitable algorithm or the like in the control device 10. The control device 10 then determines all of the required control parameters for the generators G-i and consequently controls the reactive power generated by the individual generators G-i in such a way that in total the required reactive power can be provided at the point of common coupling 20, and the voltage at the point of common coupling 20 also corresponds to the required reference value.

If the multi-generator power plant arrangement 1 is a grid-supporting power plant arrangement, the control device 10 can also vary the reactive power generated by the multi-generator power plant arrangement 1 in dependence on a voltage fluctuation at the point of common coupling 20.

Figure 2:
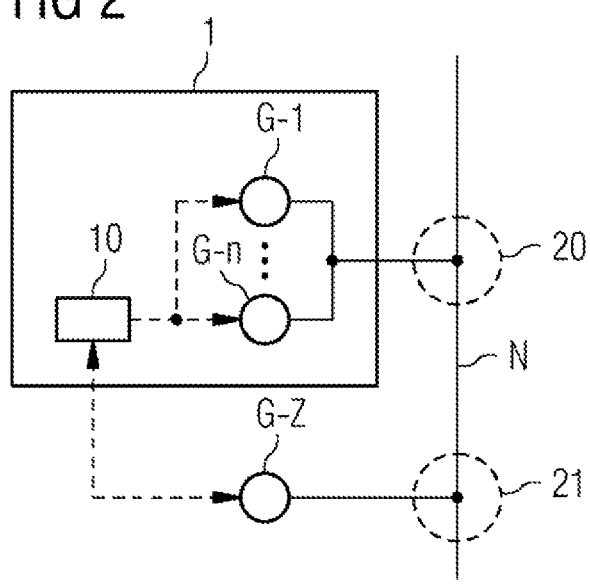
FIG. 2 shows a schematic representation of an energy supply network with a multi-generator power plant arrangement according to one embodiment.

FIG. 2 shows a schematic representation of an embodiment of an energy supply network with a multi-generator power plant arrangement 1. In addition, in this configuration, the energy supply network comprises at least one further generator G-z. This generator G-z can also feed not only pure active power but also a variable reactive power component into the energy supply network N. In order to coordinate the provided reactive power component for all of the generators G-i of the multi-generator power plant arrangement 1 and of the further generator G-z, the control device 10 can also determine control parameters for this further generator G-z and transmit them to the further generator G-z.

Figure 3:
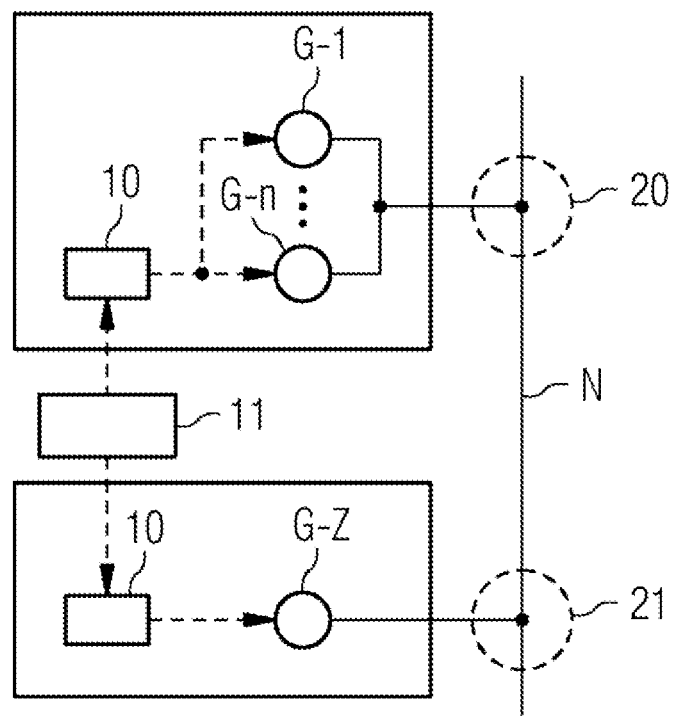
FIG. 3 shows a schematic representation of an energy supply network according to a further embodiment.

FIG. 3 shows a further embodiment of an energy supply network N with a multi-generator power plant arrangement 1. In addition, this energy supply network N also comprises further generators G-z. In this embodiment, as also in the one previously mentioned, the further generators G-z may also be generators of further multi-generator power plant arrangements in which the electrical active power and reactive power is in each case generated by more than one generator and fed into the energy supply network N. Furthermore, in this embodiment, the energy supply network N has a higher-level further control device 11, which for its part divides the reactive power to be fed into the energy supply network N and transmits information concerning the reactive power components to be fed in to the control devices arranged hierarchically below it, such as for example the control device 10. In addition, multi-stage hierarchical arrangements for dividing the distribution of the reactive power are also possible.

Combinations of power plant arrangements with grid-forming properties and power plant arrangements with grid-supporting properties are also possible.

Figure 4:
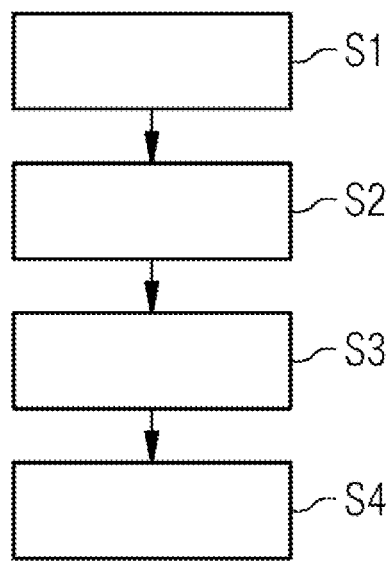
FIG. 4 shows a schematic representation of a flow diagram, as used as a basis for a method for distributing the reactive power generation in a multi-generator power plant arrangement.

FIG. 4 shows a schematic representation of a flow diagram, as used as a basis for a method for distributing the reactive power generation in a multi-generator power plant arrangement 1. In a step S1, first a reactive power to be generated by a multi-generator power plant arrangement 1 is determined.

Then, in step S2, the reactive power to be generated is divided among the generators G-i of the multi-generator power plant arrangement 1. The dividing of the reactive power to be generated among the individual generators G-i may either be specified by a user or be determined automatically by an algorithm or the like. In addition, an expected or unexpected change in reactive power may also be divided among the generators.

Subsequently, in step S3, the control variables for the output voltage of the grid-forming generators G-i of the multi-generator power plant arrangement 1 are calculated. The control variables for the output voltages of the respective generators are calculated by using a reactive power to be fed in by the respective generator. The calculated control variables for a generator G-i correspond here in each case to the reactive power to be generated by the respective generator G-i. The calculation of the control variables for the generators G-i may be performed in particular while taking account of the impedances between the generator and the network feeding-in point. If a transformer T-i is arranged between the generator G-i and the network feeding-in point 20, the calculation may also be performed in particular while taking into account the reactances of the respective transformer T-i. In particular, a voltage offset and/or possibly also a steepness of a controller in the generator G-i are calculated in the calculation of the control variables for the respective generators.

In step S4, finally, the calculated control variables are transmitted to the respective generators G-i.

To sum up, embodiments of the present invention relates to a multi-generator power plant arrangement, and also to a method for distributing the reactive power generation in a multi-generator power plant arrangement. The control parameters for the controllers of the individual generators of a multi-generator power plant arrangement are thereby calculated individually on the basis of predetermined parameters and transmitted to the controllers of the individual generators. Consequently, the reactive power component to be generated in each case can be individually specified for each generator of a multi-generator power plant arrangement.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A multi-generator power plant arrangement, comprising:
   a network feeding-in point, which is electrically coupled to an energy supply network;
   a plurality of generators, which are in each case electrically coupled to the network feeding-in point and are designed to provide a reactive power in dependence on a first control variable, wherein at least one generator of the plurality of generators is a grid-forming generator, which is designed to provide an output voltage at a specified amplitude and a specified frequency or phase on a basis of a second control variable, wherein the reactive power to be provided by the plurality of generators is divided among the plurality of generators using a predetermined ratio or predetermined rules such that each respective generator of the plurality of generators has a designated reactive power to be fed in; and a control device, which is designed to calculate a respective second control variable for the output voltage of the at least one grid-forming generator by using the designated reactive power to be fed in by a respective grid-forming generator of the plurality of generators, and to transmit the calculated respective second control variable to the respective grid-forming generator of the plurality of generators.

2. The multi-generator power plant arrangement as claimed in claim 1, wherein the control device calculates the second control variable for the reactive power to be provided and/or a predetermined output voltage of a generator of the plurality of generators by using an impedance between the generator of the plurality of generators and the network feeding-in point.

3. The multi-generator power plant arrangement as claimed in claim 2, wherein the impedance between the generator of the plurality of generators and the network feeding-in point comprises a line impedance between the generator of the plurality of generators and the network feeding-in point.

4. The multi-generator power plant arrangement as claimed in claim 2, further comprising a transformer, which is arranged between the network feeding-in point and the at least one generator of the plurality of generators, and an impedance between the at least one generator of the plurality of generators and the network feeding-in point comprises a reactance of the transformer.

5. The multi-generator power plant arrangement as claimed in claim 1, wherein the plurality of generators in each case comprise a droop controller which is designed to set the reactive power provided by the respective generator of the plurality of generators in dependence on a voltage offset and/or a controller steepness, or to set the voltage provided by the respective generator of the plurality of generators in dependence on a reactive power offset or reactive current offset and/or the controller steepness.

6. The multi-generator power plant arrangement as claimed in claim 5, wherein the second control variable determined by the control device adapting the voltage offset of the droop controller of the respective generator of the plurality of generators.

7. The multi-generator power plant arrangement as claimed in claim 5, wherein the second control variable determined by the control device also adapt the controller steepness of the droop controller of the respective generator of the plurality of generators.

8. The multi-generator power plant arrangement as claimed in claim 1, further comprising a grid-forming power plant arrangement, which is designed to provide a network voltage at a predetermined amplitude and a predetermined frequency or phase at the network feeding-in point.

9. The multi-generator power plant arrangement as claimed in claim 1, further comprising a grid-supporting power plant arrangement, and the control device being designed to set the reactive power to be provided at the network feeding-in point in dependence on a network voltage at the network feeding-in point.

10. An energy supply network, with a multi-generator power plant arrangement as claimed in claim 1.

11. The energy supply network as claimed in claim 10, further comprising a further network feeding-in point and a further generator, the further generator being electrically coupled to the further network feeding-in point and designed to provide reactive power in dependence on the second control variable; and the control device also being designed to calculate the second control variable in dependence on the reactive power to be provided by the further generator and/or the predetermined output voltage of the further generator and transmit the second control variable to the further generator.

12. The energy supply network as claimed in claim 10, further comprising a further control device, which is designed to determine a variable for the reactive power to be provided and/or the predetermined output voltage of the further generator and to transmit the variable to the control device of the multi-generator power plant arrangement.

13. A method for distributing a reactive power generation in a multi-generator power plant arrangement with a plurality of generators, at least one generator of the plurality of generators being a grid-forming generator, which is designed to provide an output voltage at a predetermined amplitude and a predetermined frequency or phase, the method comprising:

determining a reactive power to be generated by the multi-generator power plant arrangement in dependence on a first control variable;

dividing the reactive power to be generated among the plurality of generators, the reactive power being divided among the plurality of generators by using a predetermined ratio or predetermined rules such that each generator of the plurality of generators has a designated reactive power to be fed in;

calculating respective second control variable for the output voltage of each grid-forming generator, the respective second control variable being calculated by using the designated reactive power to be fed in by a respective grid-forming generator of the plurality of generators; and transmitting the respective second control variable to each respective grid-forming generator of the plurality of generators.

14. The method as claimed in claim 13, the step for calculating the second control variable for the plurality of generators calculating the second control variable by using impedances between a network feeding-in point and the respective generator of the plurality of generators.

* * * * *